United States Patent
Brittain et al.

(10) Patent No.: US 7,493,456 B2
(45) Date of Patent: Feb. 17, 2009

(54) MEMORY QUEUE WITH SUPPLEMENTAL LOCATIONS FOR CONSECUTIVE ADDRESSES

(75) Inventors: Mark Andrew Brittain, Pflugerville, TX (US); Warren Edward Maule, Cedar Park, TX (US); Eric Eugene Retter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/549,429

(22) Filed: Oct. 13, 2006

(65) Prior Publication Data

US 2008/0091881 A1    Apr. 17, 2008

(51) Int. Cl.
G06F 12/00 (2006.01)
G06F 13/16 (2006.01)

(52) U.S. Cl. .................. 711/154; 711/212
(58) Field of Classification Search .......... None
See application file for complete search history.

(56) References Cited

U.S. PATENT DOCUMENTS

| | | | |
|---|---|---|---|
| 5,450,600 A | 9/1995 | Abe | |
| 5,513,135 A | 4/1996 | Dell | |
| 5,613,155 A * | 3/1997 | Baldiga et al. | 710/5 |
| 5,644,786 A * | 7/1997 | Gallagher et al. | 710/30 |
| 6,101,568 A | 8/2000 | Richardson | |
| 6,173,382 B1 | 1/2001 | Dell | |
| 6,226,695 B1 | 5/2001 | Kaiser | |
| 6,510,100 B2 | 1/2003 | Grundon et al. | |
| 6,587,912 B2 | 7/2003 | Leddige et al. | |
| 6,801,620 B2 | 10/2004 | Smith et al. | |
| 6,807,588 B2 | 10/2004 | Hoang et al. | |
| 6,931,501 B1 | 8/2005 | Narayanaswamy | |
| 7,162,550 B2 * | 1/2007 | Douglas | 710/35 |
| 7,299,324 B2 * | 11/2007 | Shrader et al. | 711/158 |
| 7,392,333 B2 * | 6/2008 | Chiu | 710/62 |
| 2002/0059476 A1 * | 5/2002 | Yamada | 710/1 |
| 2004/0019706 A1 * | 1/2004 | Smith | 710/1 |
| 2005/0005261 A1 | 1/2005 | Severin | |
| 2005/0240649 A1 | 10/2005 | Elkington | |

OTHER PUBLICATIONS

Kaxiras—Improving Request-Combining For Widely Shared Data in Shared-Memory Multiprocessors, Massively Parallel Computing Symposium (1998).
Zhou—A Greedy I/O Schedule Method in the Storage System of Clusters—Turku Centre for Computer Science (Feb. 2003).

* cited by examiner

Primary Examiner—Kevin Verbrugge
(74) Attorney, Agent, or Firm—Libby Handelsman; Mark P Kahler

(57) ABSTRACT

A memory controller includes an address queue with address queue locations that may expand to store address commands that point to consecutive locations in memory. In this manner, multiple address commands may combine together in a common expanded address queue location. In one embodiment, each address queue location includes a main information portion and a supplemental information portion. The supplemental information portion is smaller than the main information portion. The main information portion stores the target address information of a first address command. When the address queue receives an address command with a target address that is consecutive to the target address of the first command, then the supplemental address portion stores a subset of the target address of the second command.

20 Claims, 4 Drawing Sheets

MEMORY QUEUE WITH SUPPLEMENTAL LOCATIONS FOR CONSECUTIVE ADDRESSES

TECHNICAL FIELD OF THE INVENTION

The disclosures herein relate generally to memory systems, and more particularly, to instruction or command queues in memory systems that information handling systems employ.

BACKGROUND

An information handling system (IHS) may include one or more address queues that store information designating memory locations that the IHS should access. Memory may include volatile storage such as system memory and non-volatile storage such as media drives. In the case of volatile storage such as system memory, an IHS typically includes a memory controller with an address queue. An address queue generally includes a number of latches, each latch storing a respective queue entry such as a memory access command. Each memory access command in the queue includes address information that refers to a respective target address or location in the system memory that the memory controller should access. Address queue designers usually desire that a queue be as large as possible to store a maximum number of ready-to-execute memory access commands. Unfortunately, larger queues require more power to operate than smaller queues. Moreover, larger queues consume greater amounts of valuable semiconductor chip real estate than smaller queues.

A typical address queue includes an input that receives queue entries and an output which provides queue entries for execution. More particularly, the address queue input receives a queue entry and stores the queue entry in a respective latch. A queue entry percolates from latch to latch in the queue as it progresses from the queue input to the queue output prior to execution. When system memory includes a number of pages or banks, page mode logic may couple the output of the address queue to the system memory. The page mode logic may combine two memory access commands that exit the output of the address queue to more efficiently access system memory if these two memory access commands reference addresses in the same bank and row of the system memory. While such a page mode logic configuration may improve memory access efficiency, it does not address the size problem of physically large address queues.

What is needed is an address queue apparatus and methodology that addresses the problems above.

SUMMARY

Accordingly, in one embodiment, a method is disclosed for accessing information in a memory. The method includes providing an address queue including a plurality of queue entry locations, each queue entry location including a main information location and a supplemental information location. The method also includes testing, by a queue controller, first and second memory access commands to determine if the first and second memory access commands refer to consecutive memory locations in a memory. The method further includes storing the first memory access command and a portion of the second memory access command in the same queue entry location of the memory queue if the testing step determines that the first and second memory access commands refer to consecutive memory locations in the memory.

The method still further includes storing the first memory access command and the second memory access command in different queue entry locations, respectively, of the memory queue if the testing step determines that first and second memory access commands do not refer to consecutive memory locations in the memory.

In another embodiment, a method is disclosed for accessing information in a memory. The method includes providing an address queue including a plurality of queue entry locations, each queue entry location including a main information location and a supplemental information location. The method also includes receiving, by a queue controller, a plurality of memory access commands including a new memory access command that refers to a target address. The method further includes storing, by the queue controller, a subset of the target address of the new memory access command in the supplemental information location of a particular queue entry location if the subset corresponds to the target address of another memory access command stored in the main information location of the particular queue entry location. The method still further includes otherwise storing, by the queue controller, the full target address of the new memory access command in a main information location of a queue entry location other than the particular queue entry location.

In yet another embodiment, a memory controller is disclosed that includes a queue controller that receives a plurality of memory access commands including a new memory access command that refers to a target address. The memory controller also includes an address queue, coupled to the queue controller, including a plurality of queue entry locations, each queue entry location including a main information location and a supplemental information location. In this embodiment, the queue controller stores a subset of the target address of the new memory access command in the supplemental information location of a particular queue entry location if the subset corresponds to the target address of another memory access command stored in the main information location of the particular queue entry location. Otherwise the queue controller stores the full target address of the new memory access command in a main information location of a queue entry location other than the particular queue entry location.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
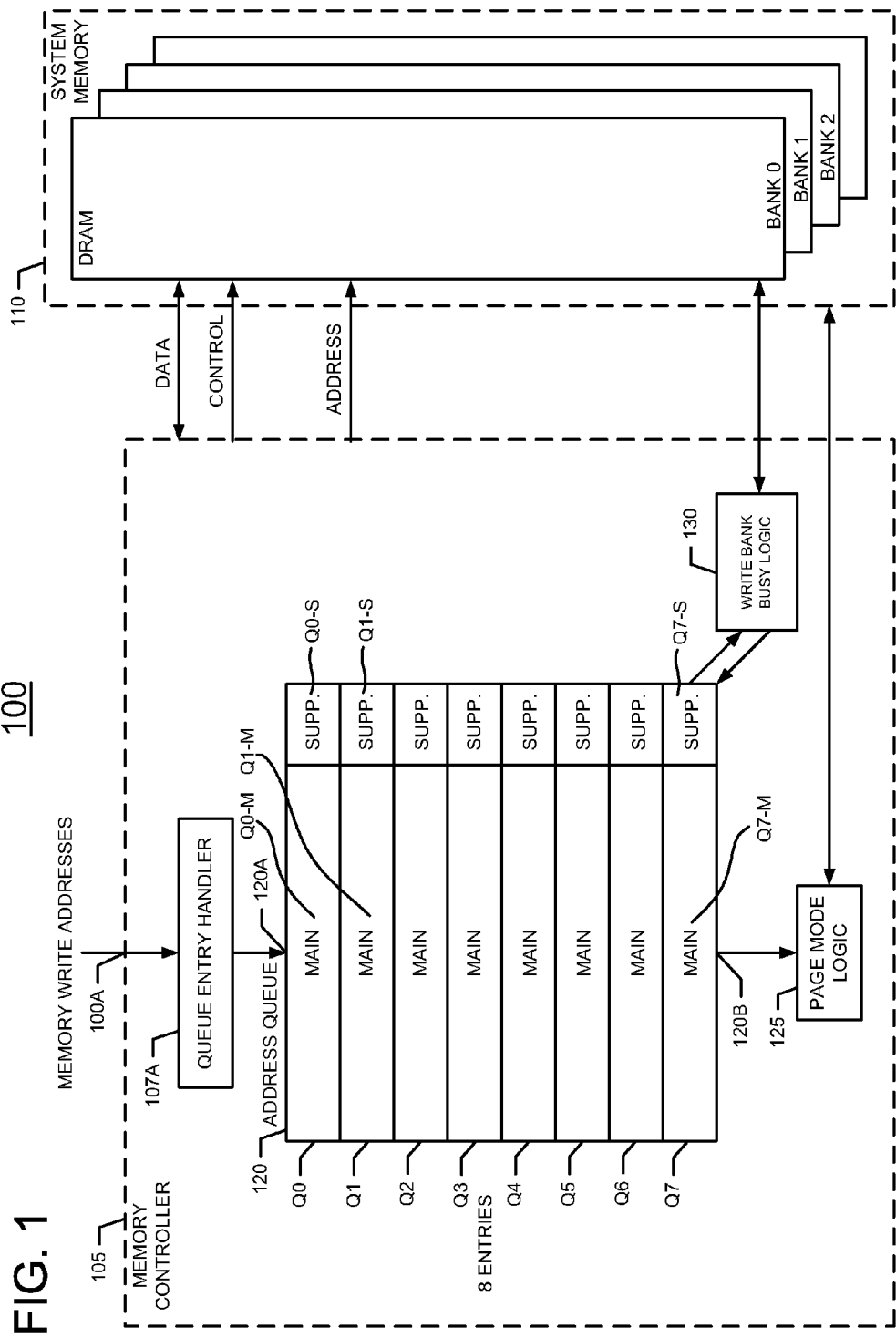
FIG. 1 shows one embodiment of the disclosed memory controller and address queue methodology.

FIG. 1 shows one embodiment of a memory access system 100 that includes a memory controller 105 that couples to a system memory 110. System memory 110 includes banks 0, 1, 2 . . . that together form pages of memory. System memory 110 includes multiple storage locations or slots, each location corresponding to a respective address. A page of memory is a subdivision of the address space that system memory 110 provides.

In one embodiment, system 100 receives a sequence of memory access commands, for example memory write commands, at input 100A. Each memory write command includes a memory write address that specifies a location in system memory 110 to which memory controller 105 should write data or information. The memory write command also includes an indication of the data that memory controller 110 should write to the specified address in system memory 110. While in this particular example system 100 performs write operations, the same methodology applies as well to read operations. The term "memory access command" includes both memory write commands and memory read commands. Address command is another term for memory access command.

Memory controller 105 includes a queue entry handler 107A that couples to an input 120A of address queue 120. Address queue 120 receives a command or instruction stream that includes address commands such as memory access commands. Address queue 120 includes a number of queue address locations Q0, Q1, Q2, . . . Q7 for storing address commands, namely address entries. Each address location includes a main information location and a smaller supplemental information location. For example, address location Q0 includes a main information location Q0-M including 45 bits and a supplemental information location Q0-S including 5 bits. The main information locations Q0-M, Q1-M, Q2-M, . . . Q7-M and the supplemental information locations Q0-S, Q1-S, Q2-S . . . . Q7-S of address queue 120 may employ a larger or smaller number of bits than this example as long as the main information locations include more bits than the supplemental information locations. In one embodiment, each of the main information locations exhibits the same number of bits and the supplemental information locations exhibit the same smaller number of bits. While in this particular embodiment, address queue 120 includes 8 queue entry locations, address queue 120 may include a greater or smaller number of queue entry locations than 8, depending upon the particular application.

Memory controller 105 is capable of compressing two adjacent address commands into a single address queue location, such as address queue location Q0 for example. To achieve this, queue entry handler 107A tests each address command passing therethrough to determine if the address command points to a system memory target address that is consecutive to or adjacent a system memory target address to which another command in the address command instruction stream points. For example, in one embodiment, queue entry handler 107A receives a first address command followed by a second address command in the address command stream that input 100A provides to queue entry handler 107A. The first and second address commands are adjacent commands because one immediately follows the other in the address command stream. If queue entry handler 107A determines that the first address command and the second address command reference or point to consecutive addresses in system memory 110, then queue entry handler 107A stores the first address command in main information location Q0-M and a portion of the second address command in the smaller supplemental information location Q0-S in address queue 120. Because the second address command points to address space consecutive with the address space to which the first address command points, the supplemental information location Q0-S need not store the entire address command. In one embodiment, the supplemental information location Q0-S stores a subset of the full address command, namely the least significant bits (LSBs) of the address command. This provides the minimal amount of information that the memory controller may use in conjunction with the address in the main information location to specify the target address of the second address command. The supplemental information locations, such as Q0-S, may store more information than just the LSBs of the second address command, such as the bank, rank, row and column information of the target address of the command, but it need not do so. The smaller the supplemental information location Q0-S becomes, the more efficient in terms of chip real estate and power consumption a chip containing this circuitry becomes. In the above example, memory controller 105 thus stores two address commands in the same entry of the address queue, namely entry Q0.

This compression methodology is most effective with streaming data, namely an address command instruction stream where adjacent instructions point to adjacent or consecutive addresses in system memory. If queue entry handler 107A should determine that the first and second address commands do not point to consecutive addresses in system memory 110, then the first and second address commands are not eligible for compression into the same queue entry location as before. Instead, queue entry handler 107A stores the first address command in main information location Q0-M and the second address command in another main information location Q1-M. In this scenario, memory controller 105 thus stores two address commands in the different entries of the address queue, namely entries or queue address locations Q0 and Q1.

The address commands that address queue 120 stores percolate from input 120A to output 120B as time moves forward. In other words, while queue entry handler 107A adds new address commands into queue entry Q0, the address command previously in queue address location Q0 moves to queue address location Q1. This process continues as more address commands flow into address queue 120 and address commands ultimately reach queue output 120B after which the specified memory access at queue output 120B occurs. Write bank busy logic 130 couples between address queue 120 and system memory 110. Write bank busy logic 130 tests to confirm satisfaction of all memory timing requirements so that further commands to a bank of memory may issue. Page mode logic 125 couples between address queue output 120B and system memory 110. Page mode logic 125 detects commands to the same page of system memory 110 and allows the issuance of such commands consecutively without going through a bank precharge period. This allows the memory controller 105 to better utilize the memory.

Figure 2:
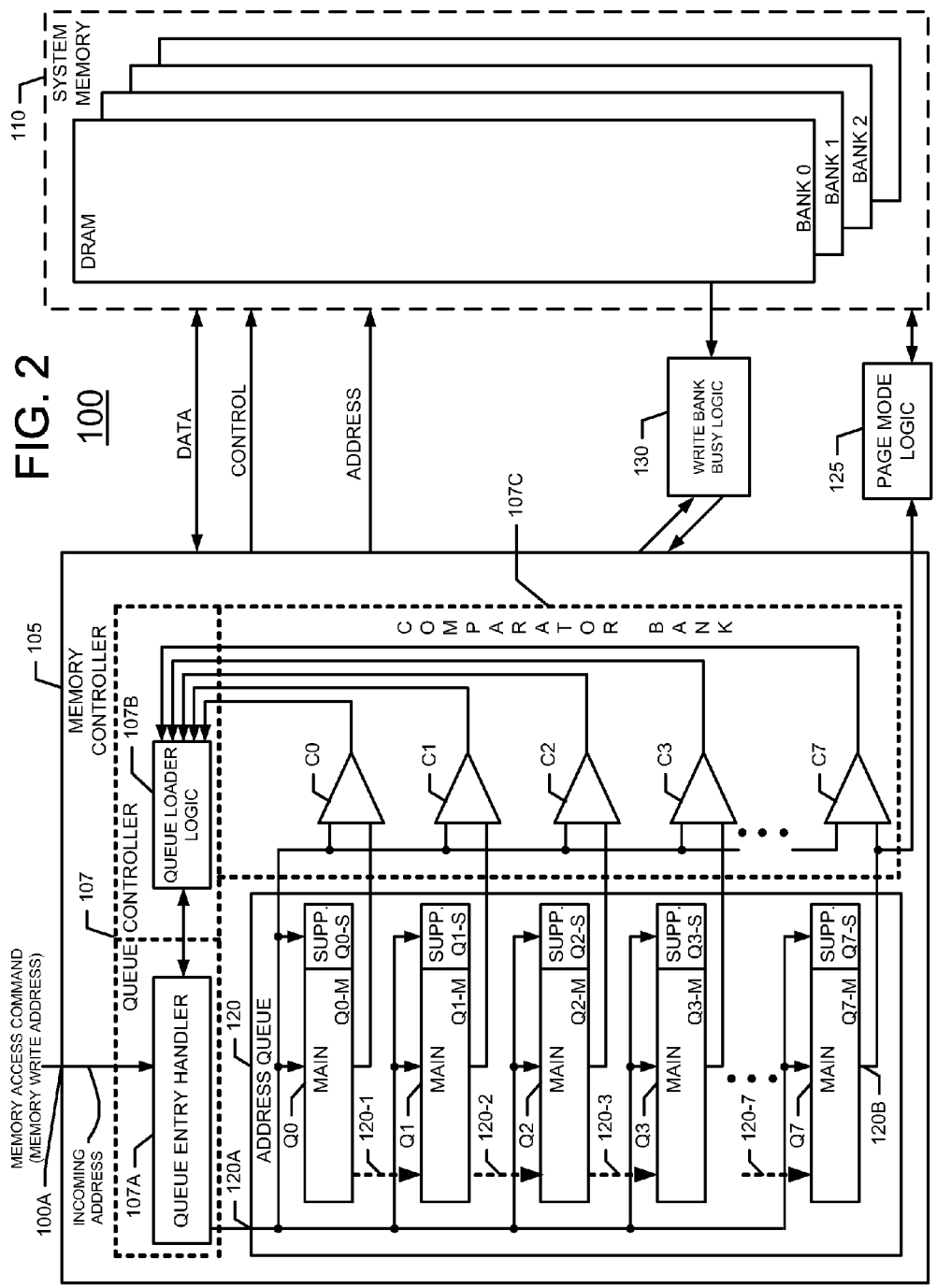
FIG. 2 shows a more detailed configuration of the address queue of FIG. 1.

FIG. 2 shows more implementation details of memory controller 105 and its address queue 120. Like numbers indicate like elements when comparing FIG. 2 with FIG. 1. Memory controller 105 includes a queue controller 107 that includes queue entry handler 107A, queue loader logic 107B and comparator bank 107C. Each queue address location Q0, Q1 . . . Q7 in the address queue 120 includes an input and an output. The output of one address queue location feeds the input of the address location queue immediately below. For example, the output of queue address location Q0 feeds the input of queue address location Q1 as feed line 120-1 indicates. The output of queue address location Q1 feeds the input of queue address location Q2 as feed line 120-2 indicates, the output of queue address location Q2 feeds the input of queue address location Q3 as feed line 120-3 indicates, and so forth until the end of the address queue at queue address location Q7. As address entries exit queue address location Q7, memory controller 105 accesses information in system memory 110 corresponding to the target addresses of such entries.

A new memory access command is a term that describes an address command as it enters queue entry handler 107A of queue controller 107. Address queue 120 may already store one or more address commands in its entries Q0, Q1, . . . Q7. Queue entry handler 107A determines whether address queue 120 stores a new incoming memory access command in a main information location or a supplemental information location of address queue 120. Queue controller 107 includes queue loader logic 107B that makes this determination using information from comparator bank 107C. Comparator bank 107C includes comparators C0, C1, . . . C7 that couple respectively to each queue address location Q0, Q1, . . . Q7 as shown. The comparators monitor the outputs of each queue address location Q0, Q1, . . . Q7 to determine if the target address of the new memory access command at the address queue input 120A matches any of the target addresses that queue address locations Q0, Q1, . . . Q7 already store. In one embodiment, the comparators exclude the column addresses in the comparison. The comparator bank 107C thus informs queue loader logic 107B if address queue 120 exhibits a hit, namely a match between the non-column address portion of the target address of the new memory access command and the non-column address portion of a target address that address queue 120 already stores. The comparator bank 107C also informs queue loader logic 107B if address queue 120 exhibits a miss, namely there is no match between the non-column address portion of the target address of the new memory access command and a non-column address portion of a target address that the address queue already stores. In the event of a hit, then queue loader logic 107B causes queue entry handler 107A to store a subset of the target address of the current memory access command in the particular supplemental information location Q0-S, Q1-S, . . . Q7-S of the entry for which the hit occurred.

In more detail, each comparator of comparator bank 107C includes a common input that couples to the output of queue entry handler 107A so that all comparators receive the new memory write address that handler 107A provides. The remaining inputs of comparators C0, C1, . . . C7 couple respectively to the outputs of queue address locations Q0, Q1, . . . Q7 as shown. The outputs of comparators C0, C1, . . . C7 couple to the queue loader logic 107B to enable queue loader logic 107B to control when memory queue entry handler 107A is able to store supplemental information in supplemental information locations Q0-S, Q1-S, . . . Q7-S. In other words, queue loader logic 107B monitors comparators C0, C1, . . . C7 to determine where to instruct queue entry handler 107A to load each new entry in address queue 120.

Acting collectively, comparators C0, C1, . . . C7 compare the non-column address portion of each new memory write address entering address queue 120 with the non-column address portion of any memory write addresses already in main information locations Q0-M, Q1-M, . . . Q7-M. If the output of one of comparators C0, C1, . . . C7 goes active, this state change constitutes a hit. The hit indicates that the new memory write address includes address information in common with a memory write address that one of the main information locations Q0-M, Q1-M, . . . Q7-M already stores. For example, if the output of comparator C0 goes active, this hit indicates that the new memory write address from handler 107A includes address information in common memory the write address that main information location Q0-M stores. This hit condition causes queue loader logic 107B to instruct queue entry handler 107A to store address information from the new memory write address in an address location in system memory 110 consecutive with the information that main information location Q0-M will store in system memory 110. More particularly, when this hit condition occurs, rather than storing the entire address or full address referenced by the new memory write address command in main information location Q0-M, instead queue entry handler 107A stores a subset of that new memory write address in supplemental information location, Q0-S. As described above, that subset may include the least significant bits (LSBs) of the new memory write access command, namely those bits of the new memory write access command that are different from the address that main information location Q0-M stores. Thus, this scenario results in a combination of multiple memory access commands in a single address queue location for which a hit occurs, namely address location Q0 in this particular example. When the entries corresponding to main information location Q0-M and supplemental information location Q0-S ultimately exit address queue 120, memory controller 105 stores data for these entries in consecutive addresses in system memory 110, in one embodiment.

However, if no hit results from the above-described compare operations, this condition indicates that the new memory write address does not reference address space in system memory 110 that is consecutive or adjacent with respect to one of the addresses that main information locations Q0-M, Q1-M, . . . Q7-M stores. In this scenario, address queue 120 stores the new memory write address as a full target address entry in queue address location Q1, namely the main information location Q1-M thereof. Alternatively, address queue 120 advances the memory address command in location Q0-M to location Q1-M and stores the new memory write address in location Q0-M. In contrast to the immediately preceding scenario, this scenario does not result in a combination of multiple memory access commands or entries at a single address queue location. Rather, in this particular scenario, two memory access commands that address non-consecutive address space in system memory 110 result in the storing of the referenced addresses in respective different queue address locations Q0 and Q1.

The above description notes that the output of each address queue location couples to the input of the address queue location immediately below in address queue 120. The output of each address queue location also couples to a respective comparator of comparator bank 107C as shown in FIG. 2. For illustrative convenience, FIG. 2 depicts the output of an address queue location that couples to the location below as separate from the output of that address queue location that couples to the respective comparator. However, in actual practice, these two illustrated outputs may represent the same physical output of an address queue location. For example, feed line 120-1 and the lower input of comparator C0 may in actual practice couple to the same physical output of address queue location Q0.

Figure 3:
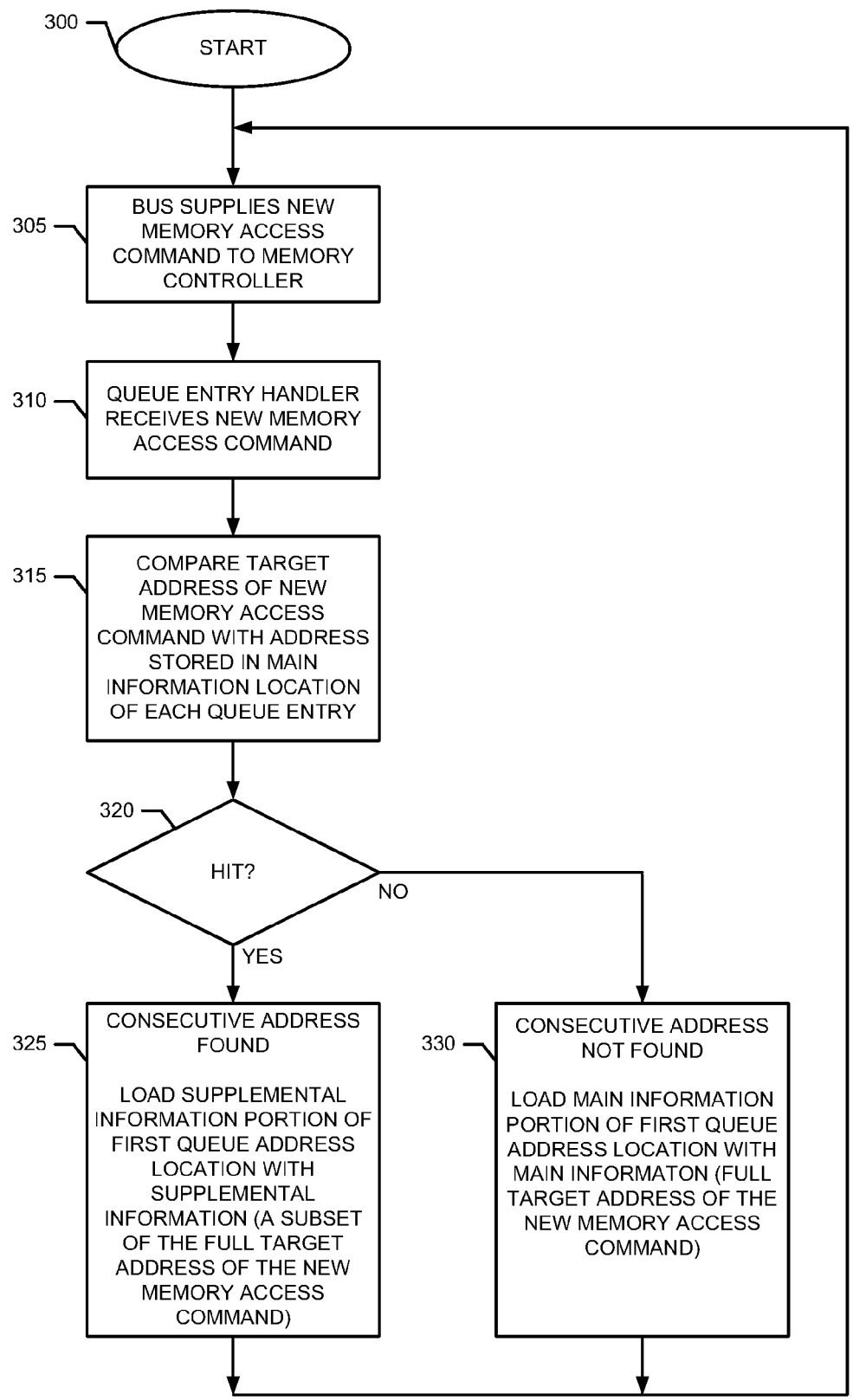
FIG. 3 shows a flowchart that describes process flow in one embodiment of the disclosed address queue methodology.

FIG. 3 is a flowchart that depicts one embodiment of the methodology for handling memory access commands that memory controller 105 employs for address queue 120. Process flow commences at start block 300. In an information handling system (IHS), a processor or system bus provides a new memory access command to a memory controller, as per block 305. For discussion purposes, address queue 120 is already full of addresses or entries from previous memory access commands such as previous write operations. Each address command or entry that the address queue 120 stores may specify a different target address in system memory 110.

The new memory access command is the next memory access command that follows the address commands in an instruction sequence that generated the entries already in the address queue.

Queue entry handler 107A receives the new memory access command, as per block 310. Comparators C0, C1, ... C7 receive the target address of the new memory access command from queue entry handler 107A. Comparators C0, C1, ... C7 compare the non-column address portion of the target address of the new memory access command with the non-column address portion of the target address of each of main information locations Q0-M, Q1-M, ... Q7-M in the address queue, as per block 315. If the compare operation results in a hit, as per block 320, then the non-column address portion of the target address of the new memory access command matches the non-column address portion of the target address of an entry already in a main information location of the address queue, for example the target address in the first queue entry Q0-M. This match or hit indicates that the target address of the new memory access command is consecutive with respect to the target address of the address command stored in Q0-M, as per block 325. In this case, the address queue need not store the entire target address of the new memory access command. Rather, the address queue stores a subset of the target address of the new memory access command in the supplemental information location Q0-S of address queue entry Q0 where the match occurred. Process flow then continues back to block 305 at which memory controller 105 receives the next new memory access command and the process repeats.

However, if no hit occurs at block 320, then the target address of the new memory access command is not consecutive with respect to any address command entry that address queue 120 already stores. In this event, the address command entry in the first address queue location Q0 moves to the second address queue location Q1 and address queue 120 then stores the full target address of the new memory access command in queue address location Q0, namely in Q0-M. Process flow then continues back to block 305 at which memory controller 105 receives the next new memory access command and the process repeats.

In one embodiment, the compare operation 315 checks to determine if the new memory access command refers to a target address in memory in the same memory row as an entry already in a main information location of the address queue. In another embodiment, the compare operation 315 checks to determine if the new memory access command refers to a target address in memory on the same memory page as an entry already in a main information location of the address queue. If the compare operation determines that the new memory access command does refer to a target address in memory on the same page as an entry already in a main information location of the address queue, then a hit occurs at decision block 320. In the event of such a hit, address queue 120 stores the entire column address of the new memory access command as an entry in the address queue. While this increases the size of the supplemental information locations of the address queue, it also increases the chances that the address queue will use the supplemental information location. In one embodiment, the address queue 120 stores entire store commands including the target address, type bits and tag bits.

Figure 4:
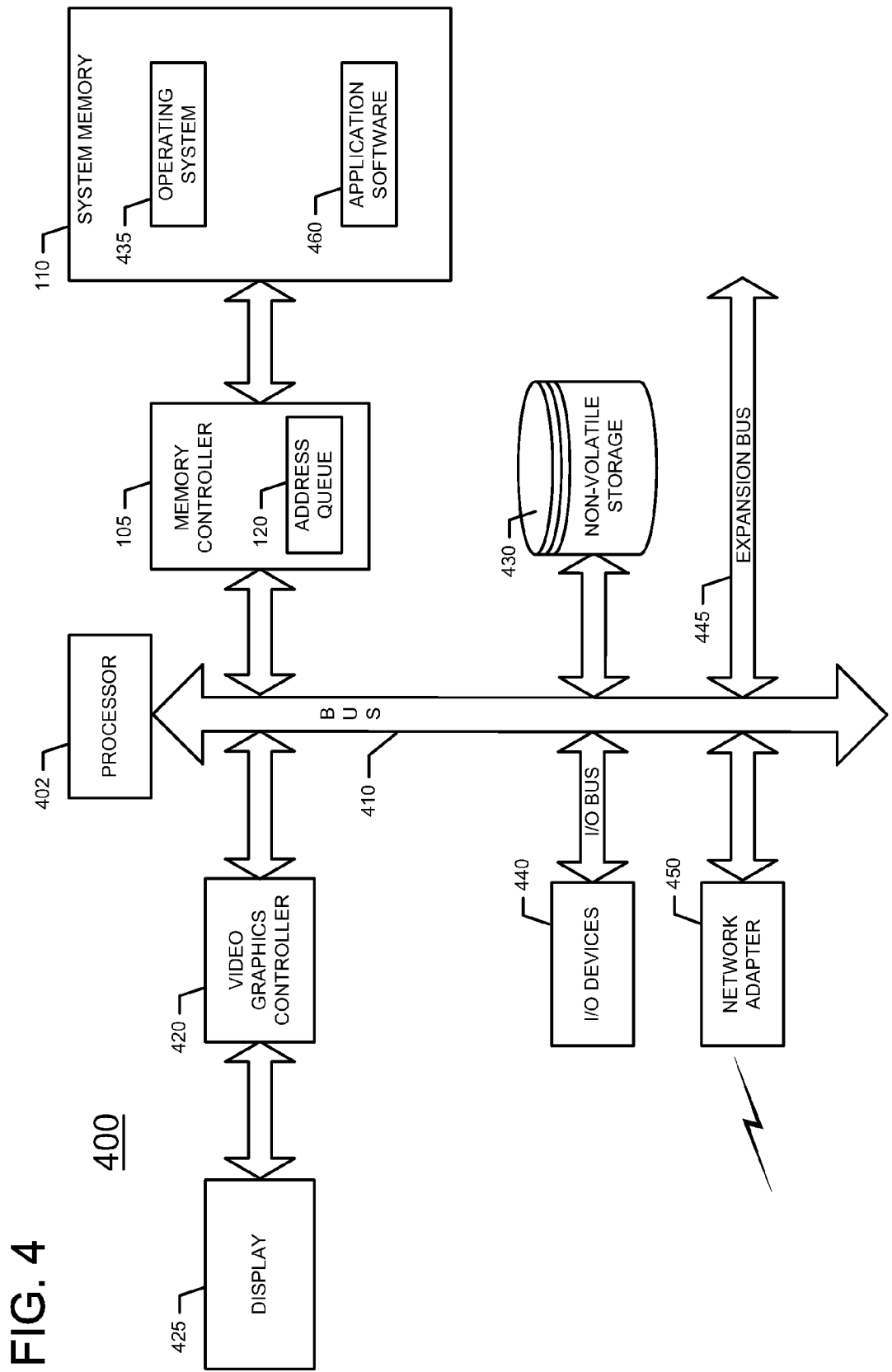
FIG. 4 shows a representative information handling system that employs the disclosed memory controller and address queue.

FIG. 4 shows an information handling system (IHS) 400 that employs the memory controller 105 including address queue 120 to provide a more efficient memory handling. IHS 400 includes a processor 402 such as a single-core or multi-core processor, for example. IHS 400 includes a bus 410 that couples processor 402 to system memory 110 and video graphics controller 420. A display 425 couples to video graphics controller 420. Nonvolatile storage 430, such as a hard disk drive, CD drive, DVD drive, media drive or other nonvolatile storage couples to bus 410 to provide IHS 400 with permanent storage of information. An operating system 435 loads in memory 110 to govern the operation of IHS 400. I/O devices 440, such as a keyboard and a mouse pointing device, couple to bus 410. One or more expansion busses 445, such as USB, IEEE 1394 bus, ATA, SATA, PCI, PCIE and other busses, couple to bus 410 to facilitate the connection of peripherals and devices to IHS 400. A network adapter 450 couples to bus 410 to enable IHS 400 to connect by wire or wirelessly to a network and other information handling systems. While FIG. 4 shows one IHS that employs memory controller 105, the IHS may take many forms. For example, IHS 400 may take the form of a desktop, server, portable, laptop, notebook, or other form factor computer or data processing system. IHS 400 may take other form factors such as a gaming device, a personal digital assistant (PDA), a portable telephone device, a communication device or other devices that include a processor and memory. IHS 400 loads application software 460 from non-volatile storage 430 to memory 110 for execution by processor 402.

The foregoing discloses a memory controller system that in one embodiment combines, within an address queue, address commands that point to consecutive locations in memory. These address commands or memory access commands may include write operations such as store operations. These address commands may also include read operations such as load operations. In one embodiment, the memory controller combines address commands that exhibit consecutive target addresses in the same queue address location or entry within the address queue. In another embodiment the memory controller combines, within a queue address location or queue entry location, related address commands that include target addresses within the same page of memory. This methodology may perform especially well for instruction streams whose instructions frequently reference consecutive target addresses, such as in the case of streaming data, for example. By providing expanded queue address locations with both a main information location and a supplemental information location, the address queue may combine multiple address commands in one queue address location or entry. While the particular example above shows a methodology for queuing memory access commands such as write commands, the methodology applies as well to read commands. Although the specific embodiment shown involves an address queue in a memory controller for a system memory, the methodology applies to other address queues as well. For example, the methodology applies to an address queue in an address controller for a media drive such as a magnetic or optical media drive, Flash memory drives and other address queues for both volatile and non-volatile storage. In actual practice, memory 110 of FIG. 1 may take any of these alternative forms of storage that would benefit from the queuing methodology taught herein.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here.

Moreover, persons skilled in the art after having the benefit of this description of the invention may use certain features of the invention independently of the use of other features, without departing from the scope of the invention.

What is claimed is:

1. A method of accessing information in a memory, the method comprising:
    providing an address queue including a plurality of queue entry locations, each queue entry location including a main information location and a supplemental information location;
    testing, by a queue controller, first and second memory access commands to determine if the first and second memory access commands refer to consecutive memory locations in a memory;
    storing the first memory access command and a portion of the second memory access command in the same queue entry location of the memory queue if the testing step determines that the first and second memory access commands refer to consecutive memory locations in the memory; and
    storing the first memory access command and the second memory access command in different queue entry locations, respectively, of the memory queue if the testing step determines that first and second memory access commands do not refer to consecutive memory locations in the memory.

2. The method of claim 1, wherein the supplemental information locations of the queue entry locations store fewer bits than the main information locations of the queue entry locations.

3. The method of claim 1, wherein the first storing step comprises:
    storing the first memory access command in the main information location of a particular queue entry location; and
    storing the second memory access command in the supplemental information location of the particular entry location if the testing step determines that the first and second memory access commands refer to consecutive memory locations in a memory.

4. The method of claim 1, wherein the second storing step comprises:
    storing the first memory access command in the main information location of a particular queue entry location; and
    storing the second memory access command in another queue entry location of the address queue if the testing step determines that the first and second memory access commands do not refer to consecutive memory locations in a memory.

5. The method of claim 1, wherein the main information locations of the queue entry locations in the address queue are each capable of storing a full target address of respective memory access commands, and the supplemental information locations of the address queue are each capable of storing a subset of the target address.

6. A method of accessing information in a memory, the method comprising:
    providing an address queue including a plurality of queue entry locations, each queue entry location including a main information location and a supplemental information location;
    receiving, by a queue controller, a plurality of memory access commands including a new memory access command that refers to a target address;
    storing, by the queue controller, a subset of the target address of the new memory access command in the supplemental information location of a particular queue entry location if the subset corresponds to the target address of another memory access command stored in the main information location of the particular queue entry location; and
    otherwise storing, by the queue controller, the full target address of the new memory access command in a main information location of a queue entry location other than the particular queue entry location.

7. The method of claim 6, wherein the supplemental information locations of the queue entry locations store fewer bits than the main information locations thereof.

8. The method of claim 6, wherein the first storing step further comprises comparing a non-column address portion of the target address of the new memory access command and non-column address portions of target addresses stored in the main information locations of the queue entry locations of the address queue.

9. The method of claim 6, wherein the memory access commands include memory write commands.

10. The method of claim 6, wherein the memory access commands include memory read commands.

11. A memory controller, comprising:
    a queue controller that receives a plurality of memory access commands including a new memory access command that refers to a target address;
    an address queue, coupled to the queue controller, including a plurality of queue entry locations, each queue entry location including a main information location and a supplemental information location;
    wherein the queue controller stores a subset of the target address of the new memory access command in the supplemental information location of a particular queue entry location if the subset corresponds to the target address of another memory access command stored in the main information location of the particular queue entry location, and wherein otherwise the queue controller stores the full target address of the new memory access command in a main information location of a queue entry location other than the particular queue entry location.

12. The memory controller of claim 11, wherein the address queue is configured such that the supplemental information locations of the queue entry locations store fewer bits than the main information locations thereof.

13. The memory controller of claim 11, wherein the queue controller includes a group of comparators that compare a non-column address portion of the target address of the new memory access command and non-column address portions of target addresses stored in the main information locations of the queue entry locations of the address queue.

14. The memory controller of claim 11, wherein the memory access commands include memory write commands.

15. The memory controller of claim 11, wherein the memory access commands include memory read commands.

16. An information handling system (IHS) comprising:
    a processor;
    a memory; and
    a memory controller coupled to the processor and the memory to control memory operations of the memory, the memory controller including:
        a queue controller that receives a plurality of memory access commands including a new memory access command that refers to a target address;
        an address queue, coupled to the queue controller, including a plurality of queue entry locations, each queue entry location including a main information location and a supplemental information location;

wherein the queue controller stores a subset of the target address of the new memory access command in the supplemental information location of a particular queue entry location if the subset corresponds to the target address of another memory access command stored in the main information location of the particular queue entry location, and wherein otherwise the queue controller stores the full target address of the new memory access command in a main information location of a queue entry location other than the particular queue entry location.

17. The IHS of claim 16, wherein the address queue is configured such that the supplemental information locations of the queue entry locations store fewer bits than the main information locations thereof.

18. The IHS of claim 16, wherein the queue controller includes a group of comparators that compare a non-column address portion of the target address of the new memory access command and non-column address portions of target addresses stored in the main information locations of the queue entry locations of the address queue.

19. The IHS of claim 16, wherein the memory access commands include memory write commands and memory read commands.

20. The IHS of claim 16, wherein the memory is one of volatile memory and non-volatile memory.

* * * * *